United States Patent
Duge

(10) Patent No.: US 9,771,945 B2
(45) Date of Patent: Sep. 26, 2017

(54) GAS TURBINE ENGINE HAVING CONFIGURABLE BYPASS PASSAGE

(71) Applicant: Rolls-Royce North American Technologies Inc., Indianapolis, IN (US)

(72) Inventor: Robert T. Duge, Carmel, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 712 days.

(21) Appl. No.: 14/140,940

(22) Filed: Dec. 26, 2013

(65) Prior Publication Data

US 2015/0003959 A1    Jan. 1, 2015

Related U.S. Application Data

(60) Provisional application No. 61/767,118, filed on Feb. 20, 2013.

(51) Int. Cl.
*F02K 3/075* (2006.01)
*F04D 27/00* (2006.01)
(Continued)

(52) U.S. Cl.
CPC ......... *F04D 27/009* (2013.01); *F01D 17/105* (2013.01); *F02C 3/04* (2013.01);
(Continued)

(58) Field of Classification Search
CPC .......... F02K 3/025; F02K 3/075; F02K 3/077; F05D 2260/962; F05D 2260/963; F05D 2260/96; F02C 9/18
See application file for complete search history.

(56) References Cited

U.S. PATENT DOCUMENTS

| 4,199,936 A | 4/1980 | Cowan et al. |
| 5,005,353 A * | 4/1991 | Acton ............. F01D 17/02 415/119 |

(Continued)

FOREIGN PATENT DOCUMENTS

| GB | 2381832 A | 5/2003 |
| GB | 2443418 A | 5/2008 |

OTHER PUBLICATIONS

International Search Report and Written Opinion, International Application No. PCT/US2013/075286, search completed Oct. 22, 2014, 13 pages.

(Continued)

*Primary Examiner* — William H Rodriguez
(74) *Attorney, Agent, or Firm* — Barnes & Thornburg LLP

(57) ABSTRACT

A gas turbine engine is disclosed which includes a bypass passage that in some embodiments are capable of being configured to act as a resonance space. The resonance space can be used to attenuate/accentuate/etc a noise produced elsewhere. The bypass passage can be configured in a number of ways to form the resonance space. For example, the space can have any variety of geometries, configurations, etc. In one non-limiting form the resonance space can attenuate a noise forward of the bypass duct. In another non-limiting form the resonance space can attenuate a noise aft of the bypass duct. Any number of variations is possible.

15 Claims, 4 Drawing Sheets

(51) Int. Cl.
  *F02K 3/02* (2006.01)
  *F01D 17/10* (2006.01)
  *F02K 3/077* (2006.01)
  *F02C 9/18* (2006.01)
  *F02C 3/04* (2006.01)

(52) U.S. Cl.
  CPC ................ *F02C 9/18* (2013.01); *F02K 3/025* (2013.01); *F02K 3/075* (2013.01); *F02K 3/077* (2013.01); *F05D 2260/96* (2013.01); *F05D 2260/962* (2013.01); *F05D 2260/963* (2013.01)

(56) References Cited

U.S. PATENT DOCUMENTS

| | | | | |
|---|---|---|---|---|
| 5,404,713 A * | 4/1995 | Johnson | ................... | F02K 1/825 60/204 |
| 6,546,729 B2 | 4/2003 | Hellat et al. | | |
| 7,055,648 B2 * | 6/2006 | Byrne | ..................... | F02C 7/045 181/216 |
| 7,730,714 B2 * | 6/2010 | Wood | ..................... | F01D 17/162 60/226.1 |
| 8,418,471 B2 * | 4/2013 | Baltas | ...................... | F02K 1/15 60/226.1 |
| 2004/0031258 A1 * | 2/2004 | Papamoschou | ........... | F02K 1/42 60/204 |
| 2004/0248053 A1 | 12/2004 | Benz et al. | | |
| 2005/0241291 A1 * | 11/2005 | Bart | ...................... | F01D 17/162 60/226.1 |
| 2006/0272887 A1 | 12/2006 | Byrne et al. | | |
| 2008/0087019 A1 | 4/2008 | Macquisten et al. | | |
| 2008/0190111 A1 | 8/2008 | Tiribuzi | | |
| 2008/0216481 A1 | 9/2008 | Pollarolo | | |
| 2009/0016874 A1 | 1/2009 | Corsmeier et al. | | |
| 2009/0025393 A1 * | 1/2009 | Sheldon | ................ | B64D 33/02 60/725 |
| 2009/0094989 A1 | 4/2009 | Kraft et al. | | |
| 2010/0011740 A1 * | 1/2010 | McVey | ................. | F02K 1/1207 60/204 |
| 2010/0089028 A1 * | 4/2010 | Baltas | ...................... | F02K 1/06 60/204 |
| 2010/0107600 A1 * | 5/2010 | Hillel | ...................... | F01D 17/08 60/235 |
| 2010/0170220 A1 * | 7/2010 | Kohlenberg | .......... | F01D 17/105 60/226.3 |
| 2012/0192543 A1 | 8/2012 | Aeberli et al. | | |
| 2012/0222397 A1 * | 9/2012 | Smith | ................... | F01D 17/162 60/226.3 |

OTHER PUBLICATIONS

International Search Report and Written Opinion, mailed Oct. 30, 2014, for corresponding International Patent Application No. PCT/US2013/075286, filed Dec. 16, 2013.

* cited by examiner

GAS TURBINE ENGINE HAVING CONFIGURABLE BYPASS PASSAGE

CROSS-REFERENCE TO RELATED APPLICATIONS

This application claims priority to U.S. Provisional Application Ser. No. 61/767,118, entitled "Gas Turbine Engine Having Configurable Bypass Passage," filed Feb. 20, 2013, which is incorporated herein by reference in its entirety.

TECHNICAL FIELD

The present invention generally relates to gas turbine engine passages, and more particularly, but not exclusively, to configurable bypass passages of gas turbine engines.

BACKGROUND

Providing the capability to manage acoustic waves remains an area of interest. Some existing systems have various shortcomings relative to certain applications. Accordingly, there remains a need for further contributions in this area of technology.

SUMMARY

One embodiment of the present invention is a unique gas turbine engine bypass passage. Other embodiments include apparatuses, systems, devices, hardware, methods, and combinations for generating acoustic waves from gas turbine engines. Further embodiments, forms, features, aspects, benefits, and advantages of the present application shall become apparent from the description and figures provided herewith.

DETAILED DESCRIPTION

Figure 1:
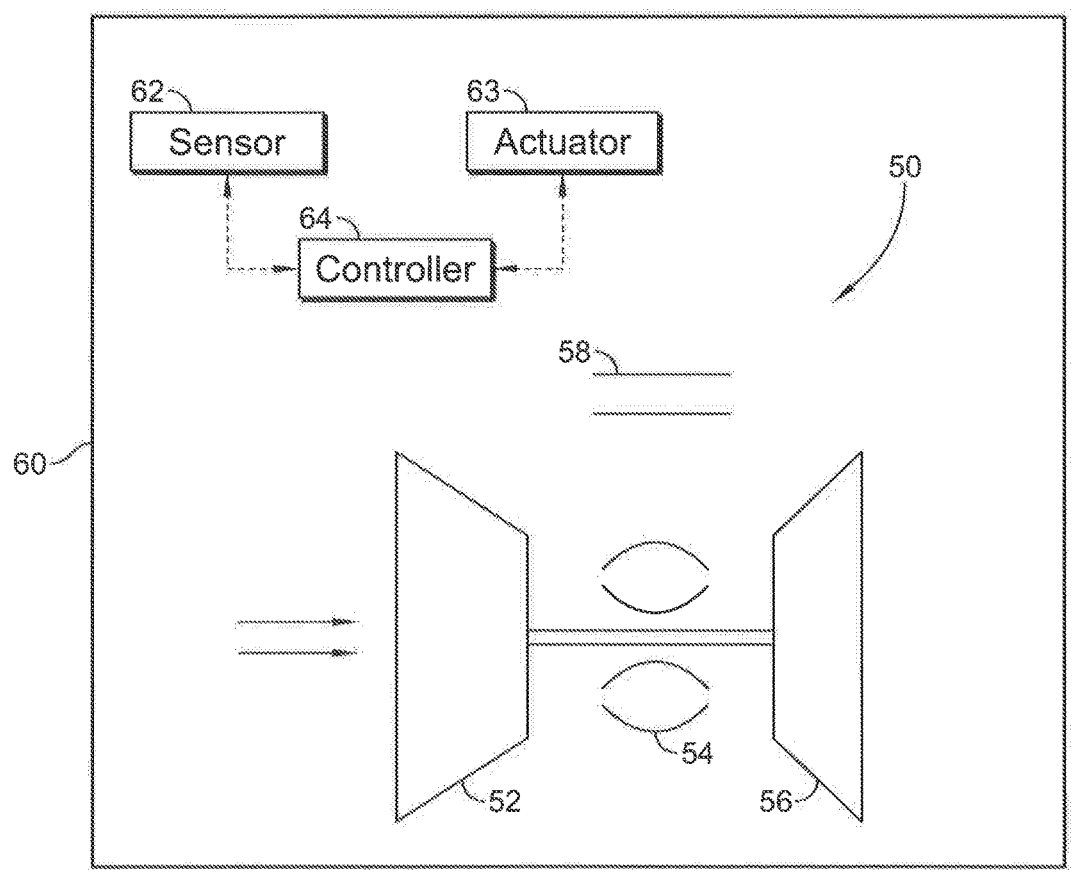
FIG. 1 discloses one embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 is depicted having an engine core that includes a compressor 52, combustor 54, and turbine 56. The gas turbine engine 50 includes a flow passage 58 that is used to bypass the engine core. The flow passage 58 can be a fan bypass passage in some embodiments such as used in turbofan engines, and can alternatively and/or additionally be a third stream bypass passage structured to withdraw a portion of working fluid from the fan bypass passage. In some embodiments the third stream bypass passage can be used to selectively flow a working fluid to change the engine cycle of the gas turbine engine 50. These types of engines can sometimes be referred to as adaptive cycle engines. The gas turbine engine 50 can take on a variety of other forms such as a turboprop, turbofan, or turboshaft engine, to set for a few examples. Furthermore, the gas turbine engine can have any number of spools.

The gas turbine engine 50 can be coupled with an aircraft 60 to provide useful power. In some forms the gas turbine engine 50 can be structured to mechanical, electrical, and/or propulsive power to an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

The aircraft 60 may operate at a variety of speeds and in one form includes a sensor 62 and controller 64. The sensor 62 can be configured to measure aircraft flight conditions such as speed and altitude, to set forth just two non-limiting examples, and can output any variety of data whether sensed or calculated. For example, the sensor 62 can sense and output conditions such as static temperature, static pressure, total temperature, and/or total pressure, among possible others. In addition, the flight condition sensor 62 can output calculated values such as, but not limited to, equivalent airspeed, altitude, and Mach number. Any number of other sensed conditions or calculated values can also be output. The flight condition sensor 62 provides data to the controller 64 and can output values in either analog or digital form.

The controller 64 is provided to monitor and control engine operations. The controller 64 can be comprised of digital circuitry, analog circuitry, or a hybrid combination of both of these types. Also, the controller 64 can be programmable, an integrated state machine, or a hybrid combination thereof. The controller 64 can include one or more Arithmetic Logic Units (ALUs), Central Processing Units (CPUs), memories, limiters, conditioners, filters, format converters, or the like which are not shown to preserve clarity. In one form, the controller 64 is of a programmable variety that executes algorithms and processes data in accordance with operating logic that is defined by programming instructions (such as software or firmware). Alternatively or additionally, operating logic for the controller 64 can be at least partially defined by hardwired logic or other hardware. In one particular form, the controller 64 is configured to operate as a Full Authority Digital Engine Control (FADEC); however, in other embodiments it may be organized/configured in a different manner as would occur to those skilled in the art. It should be appreciated that controller 64 can be exclusively dedicated to the engine 50, or may further be used in the regulation/control/activation of one or more other subsystems or aspects of aircraft 60.

Figure 2:
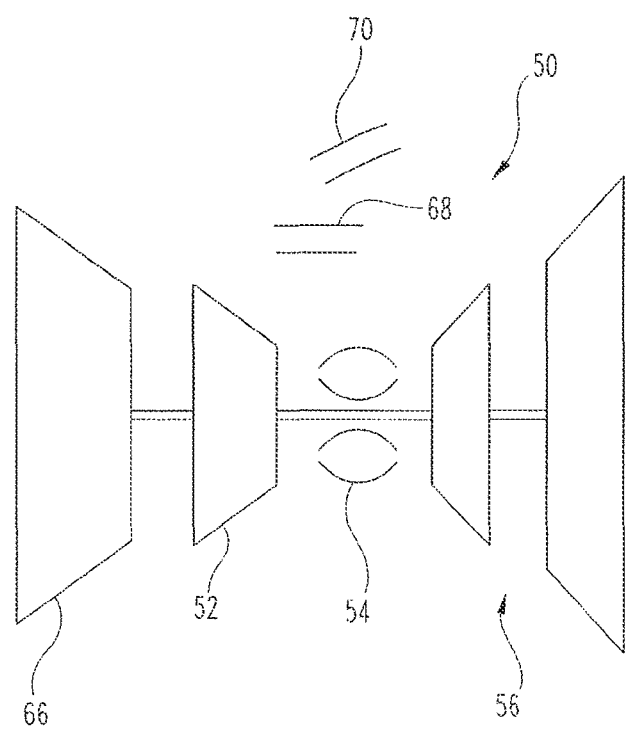
FIG. 2 discloses one embodiment of a gas turbine engine.

Turning now to FIG. 2, one embodiment is depicted in which the gas turbine engine 50 is in the form of a turbofan engine. The engine 50 includes a fan 66, having a fan bypass 68 and a third stream bypass 70. The fan bypass 68 and/or the third stream bypass 70 can be annular in configuration, but other configurations are also contemplated. In some forms either or both the fan bypass 68 and third stream bypass 70 can be segmented such that a plurality of bypass passages are created. The third stream bypass 70 can withdraw working fluid from a location between the fan 66 and the compressor 52, but other locations are also contemplated herein. In some embodiments the third stream bypass 70 can withdraw working fluid from a location between stages of a multi-stage fan. Other configurations/locations/arrangements are contemplated herein. Working fluid in the fan bypass 68 can be combined with a core flow in a nozzle (not depicted). In some forms of the engine 50 the working fluid in the third stream bypass 70 can be combined in a nozzle with the fan bypass 68 and core flow, but in other embodiments the working fluid can be dumped overboard.

In some modes of operation the bypass passage 58 need not be used to flow a working fluid. For example, in a gas turbine engine 50 that can be configured to alter its cycle, working fluid may not be needed through the bypass passage 58. In those situations, among potential others, a moveable portion can be placed in or near the bypass passage 58 to create a space useful to generate vibrations that can be detected as an acoustic signature. In one form the space is a resonance space. Various embodiments of a bypass passage 58 used to create an acoustic signature are discussed further below.

Figure 3:
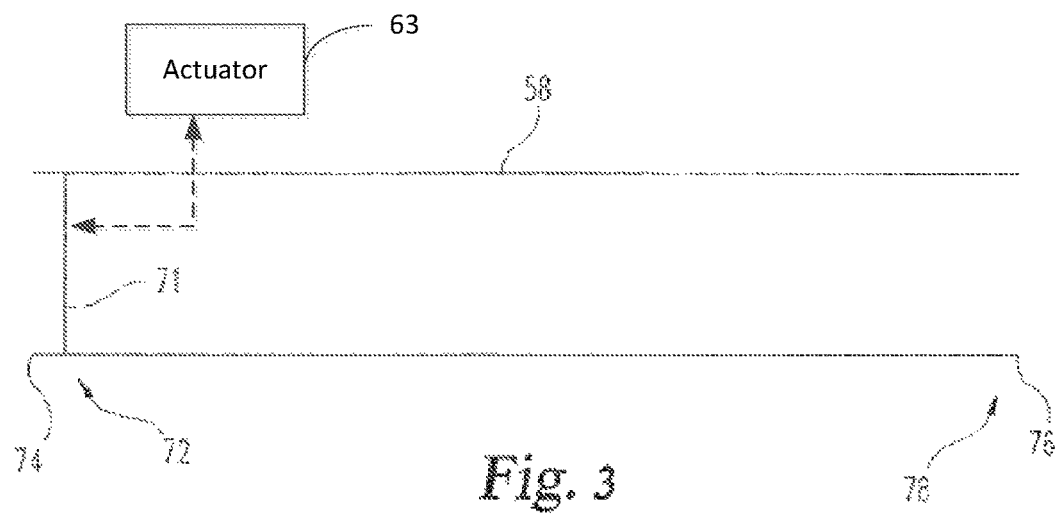
FIG. 3 discloses one embodiment of a bypass passage.

FIG. 3 illustrates a bypass passage 58 having a device or devices 71 useful for closing off a forward portion 72 of the bypass passage 58. Whether a single device or multiple devices 71 are used to close off the bypass passage 58 are needed, references made herein to either "device" in the singular or "devices" in the plural are not intended to be limiting unless otherwise explicitly stated as such. The device 71 can take a variety of forms and can be deployed using a variety of mechanisms. In one non-limiting form the device 71 is in the form of a plurality of moveable vanes that can be closed down. In another non-limiting form the device 71 can take the form of a rotatable disk having a series of apertures spaced throughout the disk which when rotated interacts with a stationary disk having a similar configuration of apertures. The device 71 can be actuated using a variety of techniques whether electrical, pneumatic, mechanical, or a combination thereof, among other possibilities.

The bypass passage 58 can be an annular passage, but in some forms need not be annular. For example, if the bypass passage 58 is ducted so that it does not form an annular shape, or is ducted such that it was withdrawn as a non-annular shape. In any event, the device 71 useful for closing or substantially closing the forward portion of the bypass passage 58 can take a variety of forms. In one non-limiting embodiment the device 71 can take the form of vanes that are rotated, but other forms are also contemplated herein.

Though the bypass passage 58 is shown being closed by the device 71 at a forward portion 72, other locations for the device 71 are also contemplated herein. The forward portion 72 in which the device 71 is used can either be coincident with the opening at a forward end 74 of the bypass passage 58, or can be located somewhat downstream from the forward end 74 but still far enough upstream from an aft end 76 of the passage 58. In an alternative embodiment the bypass passage 58 can be closed off using the device 71 at an aft portion 78 of the bypass passage 58. The aft portion 78 can either be coincident with an opening at the aft end 76, or can be located somewhat upstream from the aft end 76. In a still further embodiment, the bypass passage 58 can be closed using the device 71 at a location intermediate the forward portion 72 and aft portion 78 such that it forms a resonance space directed in a forward direction and a resonance space directed in an aft direction. The lengths of the multiple resonance spaces in this embodiment can be, but need not be, the same.

Figure 4:
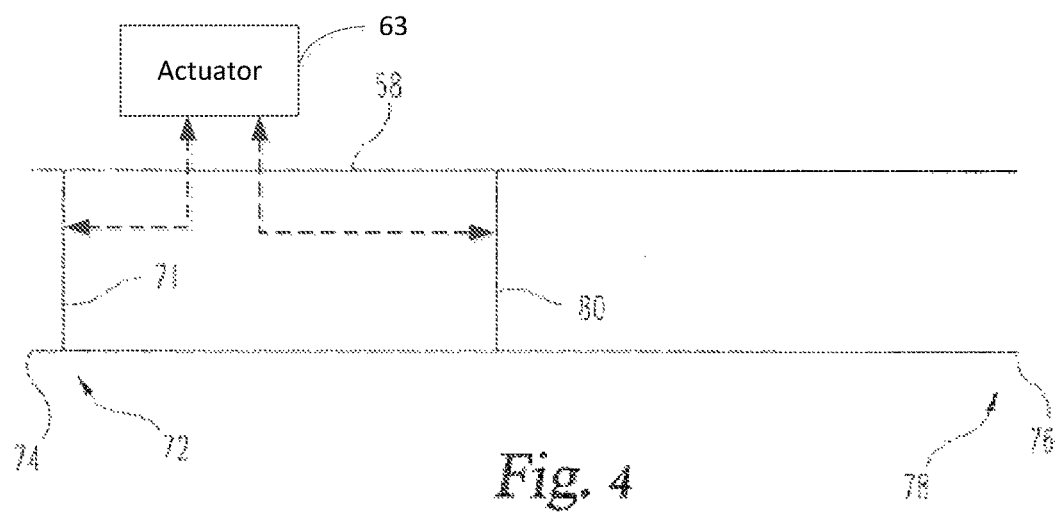
FIG. 4 discloses one embodiment of a bypass passage.

FIG. 4 depicts yet another embodiment in which a member 80 is used intermediate an aft end of the bypass passage and a forward end of the bypass passage in addition to the device 71. The member 80 can have the same form as the device 71 and/or can be actuated through similar mechanisms, but such similarity in form and/or actuation is not required. Though the device 71 is depicted at a forward portion 72 of the bypass passage 58, the other alternative locations discussed above are also contemplated herein. The member 80 can be incorporated to change the length of the open ended bypass passage 58. In some forms the member 80 is moveable such that during operation the resonance length of the bypass passage 58 can be changed. In one form the member 80 is axially translatable. In additional and or alternative embodiments, the device 71 can also be moved to change a resonance length of the bypass passage 58.

In some embodiments a noise can be created to emanate forward from the bypass passage 58 and aft from the bypass passage 58, whether that is created from an effect of the device 71 alone (as discussed above), or the device 71 in combination with the member 80. In some non-limiting embodiments, the device and/or device 71 in combination with the member 80 can be used in a forward direction to attenuate or cancel a noise from a fan, and can be used in an aft direction to attenuate or cancel a noise from a combustion propagating downstream.

Figure 5:
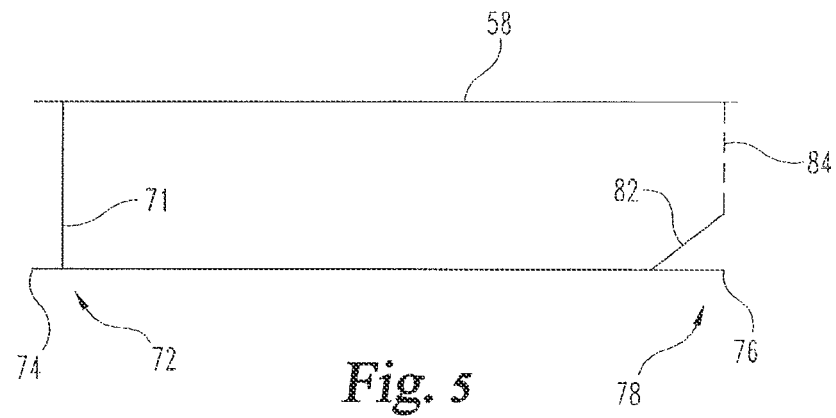
FIG. 5 discloses one embodiment of a bypass passage.

FIG. 5 depicts an embodiment in which an additional structure or structures 82 can be disposed toward an open end of the closed off bypass passage 58 that are useful to create a Helmholtz resonator. Whether a structure or multiple structures 82 are used to form a portion or portions of the Helmholtz resonator from bypass passage 58 are needed, references made herein to either "structure" in the singular or "structures" in the plural are not intended to be limiting unless otherwise explicitly stated as such.

The structure 82 can be used to form a throat 84 useful in the Helmholtz resonator and can be positioned near the opening of the bypass passage 58. The structure 82 and or other structures can be used to create various geometries useful in the formation of the Helmholtz resonator. For example, the structure 82 or structures can create a throat and neck having various geometries. The structure(s) can be moved during operation to create a Helmholtz resonator, and furthermore can be moved to create different configurations. The location of the structure 82 and/or throat 84 can be but need not be coincident with the aft end 76. Other locations are also contemplated herein. The structure 82 can be hinged at one end, but other forms of attachment and relative movement are also contemplated herein. Additionally, though the structure 82 is depicted on one side of the passage 58, in some embodiments the structure 82 can be located on the opposite side. In still further embodiments, structures 82 can be located on both sides of the bypass passage 58.

Any of the structure(s) useful to create the Helmholtz resonator can also be coupled with any of the various embodiments discussed above. In addition, the Helmholtz resonator can be tuned to provide high reduction over a narrow band or lower reduction over a broader band.

Figure 6:
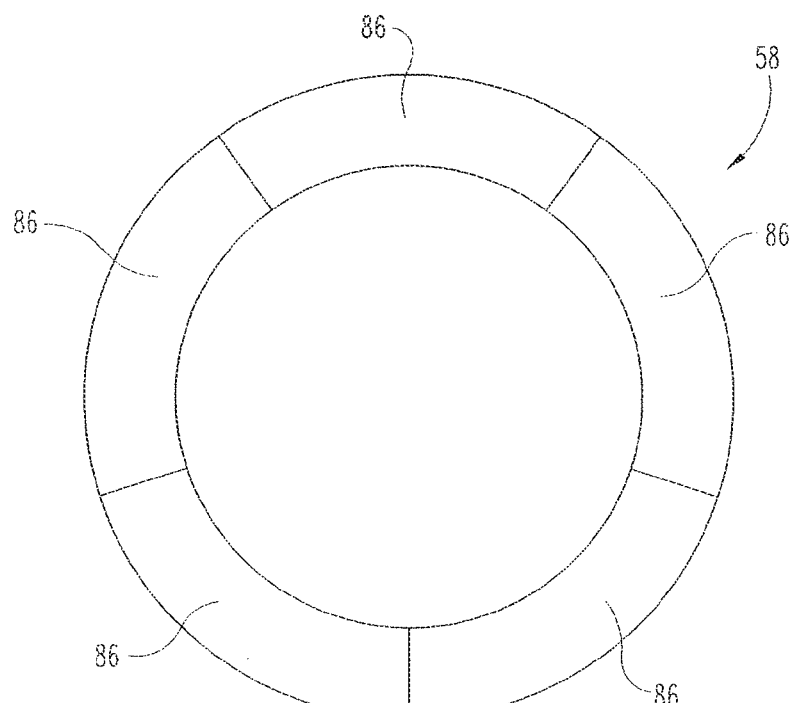
FIG. 6 discloses one embodiment of a bypass passage.

FIG. 6 illustrates one embodiment of a bypass passage 58 that has been segmented. Though the bypass passage 58 is shown as annular in the illustrated embodiment, in other forms the bypass passage 58 can take on different configurations. The segments 86 can be separated by a wall or other suitable mechanism disposed between the segments 86. The wall can either be permanent within the bypass passage 58, or can be actuated to create the segments 86 during operation, much as the devices, members, structures are used as discussed above. The segments 86, furthermore, can, but need not be the same size and shape. For example, in one non-limiting embodiment the segments 86 extend over a similar circumferential reach. If, say, four segments 86 are used then each segment could extend by up to ninety degrees each, though other configurations are also possible. The walls or other suitable mechanisms can be a variety of thicknesses and can, but need not, be the same shape and orientation. In another non-limiting embodiment, the segments 86 can have different sizes/shapes/configurations. Some of the segments 86 can have similar sizes/shapes/configurations, while others are different. In short, a wide variety of segments 86 are contemplated in a wide variety of embodiments.

Any or all of the segments 86 can be configured to produce a resonance using any of the approaches described in the various embodiments above. To set forth just one non-limiting embodiment, each of the segments 86 can be configured as described above in FIG. 3. In another non-limiting embodiment, the segments 86 can be configured differently. In some forms each of the segments 86 can be configured differently, while in other forms some of the segments 86 can be similarly configured. For example, a subset of segments 86 can take on the form described in FIG. 3, while one or more of the other segments 86 can take on one or more different forms. Other variations are contemplated herein. Any of the segments 86 can be operated independently while in other embodiments a number of segments 86 can be operated collectively.

Any of the devices 70, members 80, and structures 82 can be stowed when not needed and deployed when desired. In one form the devices, members, and/or structures, or combinations thereof, are stowed away from working fluid when the working fluid is flowed in the bypass passage 58, and are deployed to an extended position when in use to create one or more vibration affecting devices, such as a resonator.

In any of the embodiments described above the controller 64 can be in communication with one or more actuators 63 to control movement of the members, devices, and/or structures.

The devices, possibly in combination with the controller 64, can be used to mimic sounds, attenuate sounds, and accentuate sounds. A control system, using a sensor such as a microphone, and/or an algorithm dependent on flight profile, engine condition, or a combination thereof, etc, can be used to determine the appropriate actuation of members, devices, and/or structures.

In some embodiments, a wave can be created by a resonance space that is out of phase with an incident sound wave. In some further embodiments the wave is out of phase by 180 degrees. The frequency of the wave created by the resonance space need not be the same as another noise, such as a noise to be cancelled. For example, the frequency of the wave created by the resonance space can be a multiple, or a fraction, of another noise. In those embodiments having segmented bypass passage 58, each of the segments 86 can be created to generate a noise at various frequencies, whether those frequencies are the same or are different.

One aspect of the present application provides an apparatus comprising a gas turbine engine having a core flow path and a bypass duct structured to bypass a working flow around a combustor of the gas turbine engine, and a moveable component associated with the bypass duct and structured to change a flow area by moving between a first position and a second position, the moveable component actuated to the second position such that a geometry of the duct forms a resonance space tuned to attenuate a noise.

A feature of the present application further includes an actuator coupled to the moveable component and energized by a controller.

Another feature of the present application further includes a sensor structured to detect a noise information, the sensor in communication with the controller, wherein the controller is structured to operate upon the noise information when energizing the controller.

Yet another feature of the present application provides wherein the gas turbine engine is coupled to provide power to an aircraft, and wherein the noise is produced during operation of the aircraft.

Still another feature of the present application provides wherein the bypass duct includes a plurality of bypass ducts, and wherein various of the plurality of bypass ducts can form resonance spaces.

Yet still another feature of the present application provides wherein the resonance space includes a first portion forward of the moveable component and a second portion aft of the moveable component, each of the first portion and second portion capable of generating a noise.

Still yet another feature of the present application provides wherein the resonance space includes a closed first end and an open second end, the open second end having a neck and a throat.

A further feature of the present application provides wherein the geometry of the resonance space can be changed during operation of the gas turbine engine.

Another aspect of the present application provides an apparatus comprising an aircraft adaptive cycle powerplant having a duct operable to selectively admit a working fluid to adapt the powerplant to operate at different flight conditions, the duct reconfigurable to provide a resonance chamber structured to emit a noise when working fluid is discouraged from flowing through the duct.

A feature of the present application provides wherein the resonance chamber is operable to produce a noise that attenuates a noise produced other than from the duct.

Another feature of the present application provides wherein the resonance chamber is structured to produce a noise spectra of a system other than the aircraft adaptive cycle powerplant to mimic the system.

Yet another feature of the present application provides wherein the aircraft adaptive cycle powerplant including a plurality of resonance chambers.

Still yet another feature of the present application provides wherein the plurality of resonance chambers are circumferentially distributed around the aircraft adaptive cycle powerplant.

Yet still another feature of the present application provides wherein the plurality of resonance chambers are structured to emit noise having different spectral characteristics.

A further feature of the present application provides wherein the resonance chamber can be altered to change the noise emitted.

Yet another aspect of the present application provides an apparatus comprising a turbofan engine having a bypass duct structured to convey a fan flow and an offtake duct structured to bypass a combustor of the turbofan engine, the offtake duct operable to change an airflow and optimize the turbofan engine at various thrust settings and operating conditions, and means to produce a preselected noise from the offtake duct.

Still another aspect of the present application provides a method comprising flowing a working fluid through a bypass passage of a gas turbine engine, moving a component to discourage a flow of working fluid through an offtake passage of the gas turbine engine, forming a noise producing space that includes the offtake passage, and producing a targeted resonance as a result of the forming.

A feature of the present application provides wherein the producing includes mimicking a system other than the gas turbine engine.

Another feature of the present application provides wherein the producing includes attenuating a noise produced from other than the noise producing space.

Yet another feature of the present application provides wherein the producing includes producing a plurality of targeted resonances.

Still another feature of the present application provides wherein the moving includes moving a plurality of components.

Yet still another feature of the present application further includes controlling the moving of the component based upon a sensed condition, the sensed condition provided to a module capable of generating a command.

A further feature of the present application further includes actuating the moving of the component as a result of computing an algorithm.

A still further feature of the present application provides wherein the moving creates a throat of the noise producing space.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising
a gas turbine engine having a core flow path and a bypass duct structured to bypass a working flow around a combustor of the gas turbine engine;
a moveable component associated with the bypass duct and structured to change a flow area by moving between a first position and a second position, the moveable component actuated to the second position in the duct such that a geometry of the duct forms a resonance space tuned to attenuate a noise, and
an actuator coupled to the moveable component and energized by a controller and a sensor structured to detect a noise information, the sensor in communication with the controller, wherein the controller is structured to operate upon the noise information when energizing the controller.

2. The apparatus of claim 1, wherein the bypass duct includes a plurality of bypass ducts, and wherein various of the plurality of bypass ducts form resonance spaces.

3. The apparatus of claim 1, wherein the resonance space includes a first portion forward of the moveable component and a second portion aft of the moveable component, each of the first portion and second portion capable of generating a noise.

4. The apparatus of claim 1, wherein the resonance space includes a closed first end and an open second end, the open second end having a neck and a throat.

5. The apparatus of claim 1, wherein the geometry of the resonance space is changeable during operation of the gas turbine engine.

6. The apparatus of claim 1, wherein the moveable component closes off a portion of the bypass passage in the second position.

7. The apparatus of claim 6, wherein the moveable component is axially translatable along the length of the bypass duct to change a length of an open end of the bypass passage.

8. The apparatus of claim 1, wherein the moveable component is stowed away from the working fluid in the first position.

9. The apparatus of claim 1, further comprising a second movable component coupled to the actuator and associated with the bypass duct structured to change a flow area by moving between a first position and a second position, the second moveable component actuated to the second position in the duct.

10. The apparatus of claim 9, wherein the second moveable component closes off a portion of the bypass passage in the second position.

11. The apparatus of claim 9, wherein the second moveable component is axially translatable along the length of the bypass duct to change a length of an open end of the bypass passage.

12. The apparatus of claim 9, wherein the second moveable component is stowed away from the working fluid in the first position.

13. An apparatus comprising
a gas turbine engine having a core flow path and a bypass duct structured to bypass a working flow around a combustor of the gas turbine engine;
a moveable component associated with the bypass duct and structured to change a flow area by moving between a first position and a second position, the moveable component actuated to the second position in the duct,
a second movable component coupled to the actuator and associated with the bypass duct structured to change a flow area by moving between a first position and a second position, the second moveable component actuated to the second position in the duct, the first and second movable ducts actuated such that the geometry of the duct forms a resonance space tuned to attenuate a noise, and
an actuator coupled to the moveable component and the second movable component and energized by a controller and a sensor structured to detect a noise information, the sensor in communication with the controller, wherein the controller is structured to operate upon the noise information when energizing the controller.

14. The apparatus of claim 13, wherein the geometry of the resonance space is changeable during operation of the gas turbine engine.

15. The apparatus of claim 13, wherein the moveable component and the second moveable component are each axially translatable along the length of the bypass duct to change a length of an open end of the bypass passage.

* * * * *